United States Patent
Stalder et al.

(10) Patent No.: US 6,694,745 B2
(45) Date of Patent: Feb. 24, 2004

(54) METHOD FOR RUNNING UP A GAS TURBINE PLANT

(75) Inventors: Marcel Stalder, Klingnau (CH); Dieter Rebhan, Albbruck (DE); Thomas Kueenzi, Birsfelden (CH); Hans Peter Knoepfel, Dottikon (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/145,703

(22) Filed: May 16, 2002

(65) Prior Publication Data

US 2002/0194851 A1 Dec. 26, 2002

(30) Foreign Application Priority Data

Jun. 22, 2001 (CH) .................... 2001 1146/01

(51) Int. Cl.[7] ................................. F02C 7/22
(52) U.S. Cl. ........................... 60/776; 60/746
(58) Field of Search .................. 60/725, 746, 773, 60/776, 39.281

(56) References Cited

U.S. PATENT DOCUMENTS

| | | |
|---|---|---|
| 4,100,733 A | 7/1978 | Striebel et al. |
| 4,716,719 A | 1/1988 | Takahashi et al. |
| 5,303,542 A | 4/1994 | Hoffa |
| 5,402,634 A | 4/1995 | Marshall |
| 5,533,329 A | 7/1996 | Ohyama et al. |
| 5,806,299 A * | 9/1998 | Bauermeister et al. ........ 60/776 |
| 5,916,126 A | 6/1999 | Szillat et al. |
| 6,145,297 A * | 11/2000 | Nagafuchi et al. ....... 60/39.281 |
| 6,370,863 B2 * | 4/2002 | Muller et al. ................. 60/776 |
| 6,418,725 B1 * | 7/2002 | Maeda et al. ................. 60/776 |
| 6,438,937 B1 * | 8/2002 | Pont et al. .................... 60/776 |

FOREIGN PATENT DOCUMENTS

| | | |
|---|---|---|
| EP | 0597138 B1 | 5/1994 |
| EP | 0802310 A2 | 10/1997 |
| EP | 0976982 A1 | 2/2000 |
| GB | 2348675 A | 10/2000 |

* cited by examiner

*Primary Examiner*—Michael Koczo
(74) *Attorney, Agent, or Firm*—Burns, Doane, Swecker & Mathis, L.L.P.

(57) ABSTRACT

A method for running up a gas turbine plant (1) is disclosed. In the method, a fuel (6) is injected into the combustion chamber (5) via a plurality of pilot burners (10) and premix burners (11). During the start-up and in a lower load range, the combustion chamber (5) is operated in the pilot mode, and, at a specific time point, the combustion chamber (5) is changed over from the pilot mode to the premix mode. The changeover time point from the pilot mode to the premix mode depends on a variable changeover temperature ($T_{SWO}$), and this changeover temperature ($T_{SWO}$) is determined from pulsations occurring in the flame of the combustion chamber (5).

13 Claims, 1 Drawing Sheet

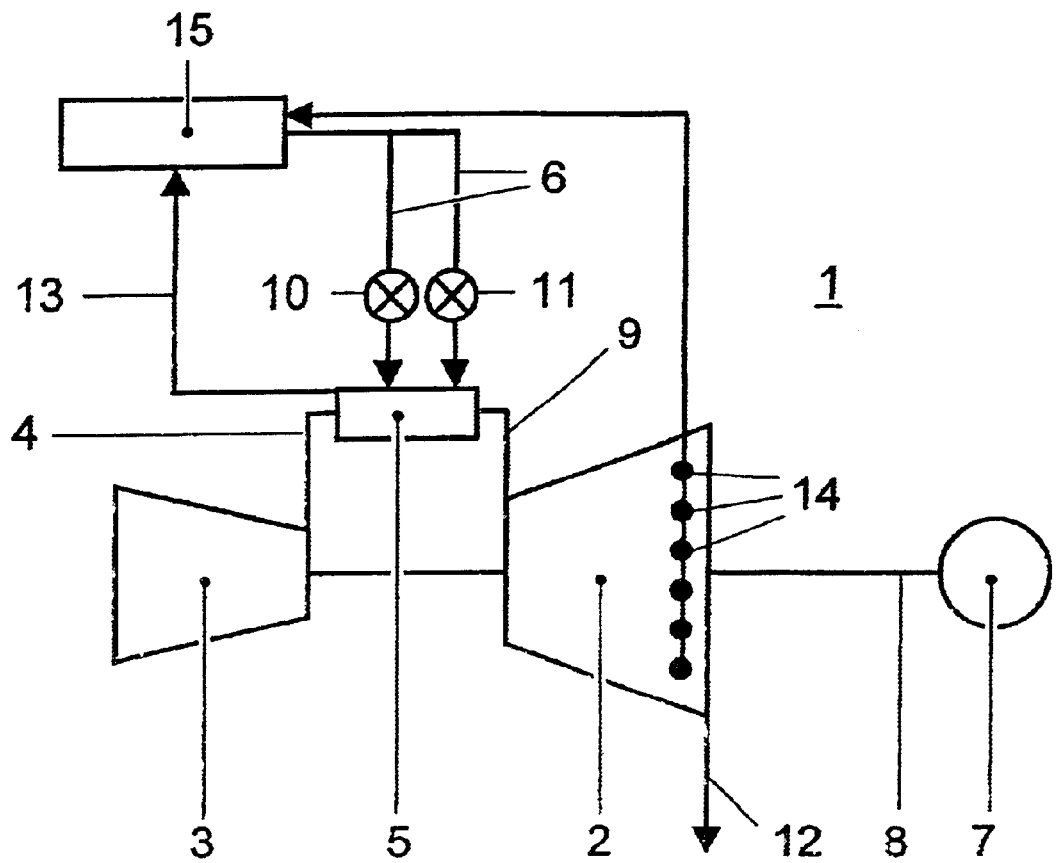

METHOD FOR RUNNING UP A GAS TURBINE PLANT

FIELD OF THE INVENTION

The present invention relates to a method for running up a gas turbine plant according to the preamble of claim 1.

BACKGROUND OF THE INVENTION

Gas turbines are increasingly equipped with multiple burners employing the lean premix technique. In this case, the fuel and the combustion air are premixed as uniformly as possible and only then fed to the flame. When this is carried out with a high air excess, relatively low flame temperatures are obtained and there is therefore an insignificant formation of nitrogen oxides.

In accordance with the geometry of gas turbines, the plurality of burners are often arranged annularly in the form of annular combustion chambers. Such annular gas turbine combustion chambers are known, for example, from EP-B1-0 597 138, U.S. Pat. No. 4,100,733, U.S. Pat. No. 5,303,542, U.S. Pat. No. 5,402,634, EP-A2-802,310 or EP-A1-976,982. The liquid or gaseous fuels are in this case fed via fuel feed rings to the burners arranged in single and multiple rings, where they are injected into the annular combustion chamber and burnt.

When gaseous fuel is used, different operating modes of the individual burners may be more or less advantageous, depending on the load state, on the number of burners in operation and on the emission values or similar characteristics of the gas turbine. In the case of double-cone burners, for example in what is known as pilot mode, the gaseous fuel may be admixed in the center, at the base of the double-cone burner, by what may be referred to as the pilot-gas piercing of the combustion air. The burners operated in this way are distinguished by a very stable flame with a high flame temperature, which, on the other hand, however, also entails unfavorable emission values. In what is known as the premix mode, on the other hand, in double-cone burners the gaseous fuel is admixed in the cone region by the lateral premix-gas piercing of the combustion air. The flames of burners in the premix mode are distinguished by a low flame temperature and the associated favorable emission values. However, they are appreciably less stable than burners operated in the pilot mode. A double-cone burner may, in principle, be constructed in such a way that it can be operated in both operating modes mentioned above, in succession and in parallel. Depending on the operating mode, the gaseous fuel is injected by means of one piercing or the other.

At the operating point of the gas turbine or in the upper load range, the burners have to operate at high firing temperatures and with low $NO_x$ emissions. The extinguishing limit of the burners in the premix mode is therefore necessarily near very high firing temperatures. For start-up and the part-load mode of the gas turbine and at the associated lower firing temperatures, therefore, additional pilot-gas injection of the burners is necessary. Stable diffusion combustion at low temperatures is thereby ensured. During the run-up of the gas turbine and when the latter is under load, there consequently has to be a changeover from the pilot mode (that is to say, diffusion combustion) to the premix mode by means of adjusting and regulating valves. The changeover must take place at a correct temperature of the flame within a narrow interval.

When a gas turbine of the type initially mentioned is run up from the idling mode into the load mode, undesirable effects often arise. Inter alia, in particular phases of the run-up and in the part-load mode, that is to say during the pilot mode, a pronounced generation of smoke and nitrogen oxides is possible, burners may be extinguished, and, moreover, an unfavorable pulsation of the gas turbine may occur. For these reasons, in the pilot mode, the burners should not be operated at flame temperatures which are too low or too high and which make it necessary to engage the gas turbine protection. On the other hand, a premature changeover from the pilot mode to the premix mode at a flame temperature which is too low leads to the extinguishing of the flame in the premix mode.

A reliable changeover from the pilot mode to the premix mode should take place at a constant flame temperature. Unfortunately, the flame temperature cannot be measured directly with sufficient accuracy. The measurement of the $NO_x$ emissions, as an indicator of the flame temperature, is also not sufficiently accurate in this case. Instead, the temperature of the exhaust gas is measured and the changeover is initiated when the mean exhaust-gas temperature measured reaches a specific fixed value. Unfortunately, even this solution may lead only to an approximate flame temperature, since the relationship between the flame temperature and the measured exhaust-gas temperature may vary. This depends, inter alia, on the ambient conditions, the internal air balance, the status of seals, the plays in the gas turbine plant, the ageing and heat penetration of the machine and other factors.

SUMMARY OF THE INVENTION

The object on which the invention is based is, therefore, to specify a method, by means of which both a run-up and a part-load mode of a gas turbine operated with the gaseous fuel are possible in a reliable, uncomplicated and low-pollutant way and an optimum point for the changeover from the pilot mode to the premix mode can be found, while harmful pulsations in the combustion chamber of the gas turbine plant are to be avoided.

The object is achieved, according to the invention, by means of a method according to the preamble of claim 1, in that (a) the changeover time point from the pilot mode to the premix mode depends on a variable changeover temperature $T_{SWO}$ and this changeover temperature $T_{SWO}$ is determined from pulsations occurring in the flame of the combustion chamber, while (b) the gas turbine plant is run up at a constant load gradient DL and the changeover is initiated without the occurrence of pulsations, in so far as an upper maximum changeover temperature $T_{SWOhot}$ is reached, and, (c) when pulsations occur, the load gradient DL is lowered and the changeover is initiated, in so far as a lower minimum changeover temperature $T_{SWOcold}$ is reached, and, (d) when further pulsations occur, at a specific exhaust-gas temperature $T_{pulslimit}$, the changeover is initiated, as soon as a variable changeover temperature $T_{SWO}$ exceeds the lower minimum changeover temperature $T_{SWOcold}$, the variable changeover temperature $T_{SWO}$ being determined from the exhaust-gas temperature $T_{pulslimit}$ by reduction by a specific amount $DT_{SWO}$, and, (e) in so far as the variable changeover temperature $T_{SWO}$ does not reach the lower minimum changeover temperature $T_{SWOcold}$, the gas turbine plant is operated for a specific time at an exhaust-gas temperature below the exhaust-gas temperature $T_{pulslimit}$ at which pulsations occur, and, thereafter, (f) the gas turbine plant is further acted upon at the lowered load gradient DL according to (c).

By means of intelligent process management with the aid of a variable definition of the changeover temperature, secondary effects, which influence the measurement of the exhaust-gas temperature and make it difficult or even impossible (transients) to determine the actual flame temperature, are ruled out in a simple way. This process management allows safe loading of the combustion chamber, without long-lasting, high and therefore harmful pulsations, along with the shortest possible warm-up time of the gas turbine plant, and also a reliably controllable changeover from the pilot mode to the premix mode, this having a positive effect on the availability of the plant.

The lowered load gradient from steps (c) and (f) may advantageously be determined indirectly via an increase in the exhaust-gas temperature $DT_1$ within a time interval. This gradient of the exhaust-gas temperature $DT_1$ may be determined variably as a function of the difference between the lower minimum changeover temperature $T_{SWOcold}$ and the exhaust-gas temperature $T_{pulslimit}$ at which pulsations occur. The variable changeover temperature $T_{SWO}$ is advantageously lowered in step (d) by less than the exhaust-gas temperature $T_{pulslimit}$ in step (e).

There is also the possibility for the gas turbine plant to be run up by means of a first pilot stage and for the lowered load gradient to be generated by a second pilot stage or by a premix stage in mixed operation with the first pilot stage, after the occurrence of pulsations. The pulsations in the combustion chamber may be measured directly or they may be detected indirectly via other operating characteristics. Further operating characteristics, in addition to the exhaust-gas temperature, may be included in the method, in order to prevent pulsations in the pilot mode. Pulsations may additionally also be avoided in another way, for example by a change in the pulse or in the swirl angle of the injected pilot-gas stream.

BRIEF DESCRIPTION OF THE DRAWING

The single FIGURE shows a gas turbine plant for carrying out the method according to the invention. Only the features which are necessary for the immediate understanding of the invention are illustrated.

DETAILED DESCRIPTION OF THE INVENTION

A method for running up a gas turbine plant 1, such as is illustrated, for example, in the single FIGURE, is disclosed. A fuel 6 is burnt, together with compressed air 4 coming from a compressor 3, in a combustion chamber 5 of the gas turbine plant 1. The combustion chamber 5 is designed as an annular combustion chamber, as is known from the prior art. The hot combustion gases 9 occurring in this case are led through a gas turbine 2 and the exhaust gases 12 are thereafter discharged in a known way. The gas turbine 2 is connected both to the compressor 3 and to a generator 7 via a shaft 8.

In the method according to the invention, the fuel 6 is injected into the combustion chamber 5 via a plurality of pilot burners 10 and premix burners 11. The gas turbine plant 1 is run up, in a first step, at a specific load gradient DL, the combustion chamber 5 being operated in the pilot mode by the pilot burners 10 during ignition and in a lower load range, and the combustion chamber 5 being changed over from the pilot mode to the premix mode at a specific time point. This changeover time point is dependent on a variable changeover temperature $T_{SWO}$ of the exhaust gases 12. For this purpose, temperature measurement 14 takes place at the end of the gas turbine 2. An overriding control unit 15 assumes the regulation of the fuel feed for the pilot and premix burners 10, 11. In addition, the gas turbine 2 is synchronized with the generator 7 in a known way.

If no pulsations are measured by pulsation measurement 13 in the combustion chamber 5 during the run-up of the gas turbine plant 1, that is to say, for example, pulsations higher than 20 mbar and 0.5 sec, the gas turbine plant 1 can be loaded with a load gradient of, for example, DL=10 MW/min, until either pulsations occur or a changeover temperature $T_{SWOhot}$, found during earlier tests and determined when the machine is warmed through, is reached. When the $T_{SWOhot}$ is reached without pulsations, a changeover from the pilot mode to the premix mode is initiated directly.

If, when the combustion chamber 5 is loaded at the selected load gradient DL or during the run-up or under minimal load, pulsations are measured in the combustion chamber 5 after synchronization, for the further loading of the gas turbine plant 1 a temperature gradient $DT_1$ of the exhaust-gas temperature is applied instead of the load gradient DL. This temperature gradient $DT_1$ predetermines the further loading of the combustion chamber 5. The temperature gradient selected, for example $DT_1$=5 K/min, is so low that the pulsation limit can be approached smoothly when the combustion chamber 5 is loaded in the pilot mode. This results correspondingly in a lower load gradient DL than is normally employed. The changeover is initiated, in so far as a defined lower minimum changeover temperature $T_{SWOcold}$ has been reached. This changeover temperature $T_{SWOcold}$ was determined from earlier tests, with the gas turbine plant 1 cold or insufficiently warmed-through.

It is an advantage of this process management that a warmed-through gas turbine plant 1, in which no pulsations occur, can be loaded with a high load gradient DL, but, in the case of a cold or insufficiently warmed-through gas turbine plant 1, when there are pulsations during run-up or in the pilot mode, partial warming through of the gas turbine plant 1 becomes possible.

Then, in the case of a cold gas turbine plant 1, during the further loading of the combustion chamber 5, the pulsation limit, that is to say, for example, pulsations higher than 20 mbar and 0.5 sec, is reached at a specific flame temperature. So as not to put the gas turbine 1 under excessive stress, when the pulsation limit is reached the accompanying exhaust-gas temperature $T_{pulslimit}$ is stored. Simultaneously, the loading of the combustion chamber 5 is reduced, that is to say the current and stored exhaust-gas temperature $T_{pulslimit}$ is reduced by a defined amount, for example $DT_{puls}$=−10 K, and the gas turbine plant 1 is operated at this temperature, so that the pulsations are thereby avoided, since the gas turbine plant 1 is operated below the detected harmful limit.

In the next step, the variable changeover temperature $T_{SWO}$ is defined. This quantity can be derived from the stored value $T_{pulslimit}$, in that this value is reduced by a defined amount (for example, $DT_{SWO}$=−5 K), the amount of $DT_{SWO}$ being smaller than the amount of $DT_{puls}$.

If the changeover temperature $T_{SWO}$ determined in this way is higher than a defined changeover temperature $T_{SWOcold}$, which was likewise determined from earlier tests in the case of a cold or insufficiently warmed-through gas turbine plant 1, a changeover to the premix mode may be initiated, otherwise the gas turbine plant 1 must be warmed through further for a defined time (for example, 10 min) at the exhaust-gas temperature $T_{pulslimit}$ limited by a controller.

After this warming-through time has elapsed, the gas turbine plant 1 is again loaded further with the abovementioned temperature gradient $DT_1=5$ K/min, until the $T_{SWOcold}$ defined as the minimum changeover temperature is reached, in so far as, with a machine which continues to be insufficiently warmed-through, pulsations do not prevent further loading of the combustion chamber 5. In this case, the newly found exhaust-gas temperature is stored as $T_{pulslimit}$ (overwriting of the $T_{pulslimit}$ stored hitherto), the exhaust-gas temperature is reduced by the abovementioned amount $DT_{puls}$ by the controller and a new variable changeover temperature $T_{SWO}$ is defined.

This cycle is run through until the warming-through of the gas turbine plant 1 has progressed to an extent such that a changeover at the exhaust-gas temperature defined as $T_{SWOcold}$ is reliably controlled.

Refinements of the method illustrated can be achieved in that, in addition to the pulsation measurements initially mentioned, further measurement quantities which exert influence on the changeover temperature are incorporated into the process management. Mention may be made, in this case, of the measurement of the ambient temperature, the compressor output temperature, various material temperatures, such as, for example, the rotor, gas turbine casing, exhaust-gas casing, the relative pressure drop across the burners, liner cooling, etc.

It may also be conceivable, furthermore, to have a process management which takes into account only the abovementioned measurement quantities of temperatures, relative pressure drops, etc., instead of the pulsations. In this case, parameter values which separate low-pulsation operation from high-pulsation operation can be established by means of tests. Loading of the gas turbine plant 1 then takes place along the limit found between low-pulsation and high-pulsation operating ranges, in that an overriding "parameter-value" controller is added to the conventional load/temperature controller. The load gradients defined in the load/temperature controller are thereby limited to an extent such that high-pulsation pilot operation is prevented.

A further attempt to restrict the pulsations detectable in the pilot mode involves a suitable change to the burner geometry. In this respect, mention may be made, in particular, of:

- a change in the pulse of the injected pilot gas by an increase/reduction in the size of the pilot-gas outlet area.
- a change in the swirl angle at which the pilot gas is injected. The ratio of the axial pulse to the radial pulse is consequently modified.
- the staggered injection of the pilot gas.

In addition to these changes on the pilot-gas side, moreover, changes on the premix-gas side may be envisaged:

- the staggered changeover of individual burners or burners combined in groups from the pilot mode to the premix mode.
- Making individual burners or burners combined into groups richer/leaner, in order to employ lower exhaust-gas temperatures in the premix mode.

A variant according to the invention of the above-described process management according to the invention is a combination of a change in geometry on the burner system and process management in which pulsation measurement and/or further measurement quantities or parameter values describing the low-pulsation operating range are incorporated.

An example may be mentioned for illustration: a first pilot stage is required in order to implement ignition and run-up to the nominal rotational speed. Further loading of the combustion chamber may take place in the first stage, up to the point where pulsations are measured for the first time. This point, influenced by the ambient temperature, by the state of the machine and by further factors, is variable, that is to say it cannot be assigned to a fixed exhaust-gas temperature.

As soon as inadmissibly high pulsations are measured, therefore, a second pilot stage is cut in, and the further loading of the combustion chamber 5 takes place via the second pilot stage. This may be carried out, for example, via one or more circumferentially distributed additional nozzles which are integrated directly in the front panel of the combustion chamber 5. The nozzles forming the second pilot stage are connected via branch lines to a ring line which, in turn, is connected to the gas supply via a regulating valve. Another kind of grouping of the pilot burners 10 may also be envisaged.

It is important, in this connection, to establish that the second pilot stage comes into use only when the first pilot stage alone does not achieve sufficient low-pulsation firing of the combustion chamber, in order to ensure a stable operation of the premix burner 11.

An arrangement and a method involving mixed operation of the pilot stage and the premix stage may also be envisaged. In this case, the gas turbine plant 1 is ignited by means of the pilot stage and the machine is accelerated to the nominal rotational speed. After the synchronization of the generator 7, the combustion chamber 5 is further loaded via the first pilot stage, until, once again, inadmissibly high pulsations are measured. Further loading of the combustion chamber is then carried out by means of mixed operation, that is to say, in addition to the fixed injected pilot-gas quantity via the pilot stage, premix gas is injected via the premix stage, until a changeover can be made to the straightforward premix mode.

| LIST OF REFERENCE SYMBOLS | |
|---|---|
| 1 | Gas turbine plant |
| 2 | Gas turbine |
| 3 | Compressor |
| 4 | Compressed air |
| 5 | Combustion chamber |
| 6 | Fuel |
| 7 | Generator |
| 8 | Shaft |
| 9 | Combustion gases |
| 10 | Pilot burner |
| 11 | Premix burner |
| 12 | Exhaust gas |
| 13 | Pulsation measurement |
| 14 | Temperature measurement |
| 15 | Control unit |
| DL | Load gradient |
| $T_{SWO}$ | Changeover temperature, variable |
| $T_{SWOhot}$ | Changeover temperature, with the gas turbine 1 warmed through |
| $T_{SWOcold}$ | Changeover temperature, with the gas turbine 1 cold |
| $DT_{SWO}$ | Reduction of the changeover temperature $T_{SWO}$ to $T_{pulslimit}$ |
| $DT_1$ | Temperature gradient |
| $T_{pulslimit}$ | Exhaust-gas temperature at pulsation limit |
| $DT_{puls}$ | Reduction of the exhaust-gas temperature |

What is claimed is:

1. A method for running up a gas turbine plant, in which at least one fuel is burnt in a combustion chamber and the hot combustion gases occurring at the same time are led through a gas turbine and thereafter discharged as exhaust gases, in which method the at least one fuel is injected into the combustion chamber via a plurality of pilot burners and premix burners, the gas turbine being run up at a specific load gradient, and the combustion chamber being operated in the pilot mode during the start-up and in a lower load range, and, at a specific time point, the combustion chamber being changed over from the pilot mode to the premix mode, the changeover time point being dependent on a predetermined exhaust-gas temperature, wherein (a) the changeover time point from the pilot mode to the premix mode depends on a variable changeover temperature and this changeover temperature is determined from pulsations occurring in the flame of the combustion chamber, while (b) the gas turbine plant is run up at a constant load gradient and the changeover is initiated without the occurrence of pulsations, in so far as an upper maximum changeover temperature is reached, and, (c) when pulsations occur, the load gradient is lowered and the changeover is initiated, in so far as a lower minimum changeover temperature is reached, and, (d) when further pulsations occur, at a specific exhaust-gas temperature, the changeover is initiated, as soon as a variable changeover temperature exceeds the lower minimum changeover temperature, the variable changeover temperature being determined from the exhaust-gas temperature by reduction by a specific amount, and, (e) in so far as the variable changeover temperature does not reach the lower minimum changeover temperature, the gas turbine plant is operated for a specific time at an exhaust-gas temperature below the exhaust-gas temperature at which pulsations occur, and, thereafter, (f) the gas turbine plant is further acted upon at the lowered load gradient according to (c).

2. The method as claimed in claim 1, wherein the lowered load gradient is determined from the steps (c) and (f) of claim 1 via a gradient of the exhaust-gas temperature.

3. The method as claimed in claim 2, wherein the gradient of the exhaust-gas temperature is determined as a function of the difference between the lower minimum changeover temperature and the exhaust-gas temperature at which pulsations occur.

4. The method as claimed in claim 1, wherein the variable changeover temperature is determined from the exhaust-gas temperature by a reduction by a specific amount, this amount being smaller than the reduction of the exhaust-gas temperature in step (e) of claim 1.

5. The method as claimed in claim 1, wherein the gas turbine plant is run up by means of a first pilot stage and the lowered load gradient from the steps (c) and (f) of claim 1 is generated by a second pilot stage after the occurrence of pulsations.

6. The method as claimed in claim 1, wherein the gas turbine is run up by means of a first pilot stage and the lowered load gradient from the steps (c) and (f) of claim 1 is generated by a premix stage after the occurrence of pulsations.

7. The method as claimed in claim 1, wherein, during the method according to claim 1, individual burners or burners combined into groups are changed over from the pilot mode to the premix mode.

8. The method as claimed in claim 1, wherein, during the method according to claim 1, individual burners or burners combined into groups are enriched or depleted with fuel.

9. The method as claimed in claim 1, wherein the pulsations in the combustion chamber are measured directly.

10. The method as claimed in claim 1, wherein the pulsations in the combustion chamber are detected indirectly via operating characteristics.

11. The method as claimed in claim 1, wherein further operating characteristics, in addition to the exhaust-gas temperature, are included in the method, in order to prevent pulsations in the pilot mode.

12. The method as claimed in claim 1, wherein the pulse of the injected fuel stream of the pilot burners is modified.

13. The method as claimed in claim 1, wherein the swirl angle of the injected fuel stream of the pilot burners is modified.

* * * * *